United States Patent
Hsu et al.

(10) Patent No.: US 8,693,180 B2
(45) Date of Patent: Apr. 8, 2014

(54) DISPLAY MODULE

(75) Inventors: Jia-Lang Hsu, Hsin-Chu (TW);
 Chih-Wei Wen, Hsin-Chu (TW);
 Ching-Chieh Pai, Hsin-Chu (TW);
 Cheng-Wei Li, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 152 days.

(21) Appl. No.: 13/272,673

(22) Filed: Oct. 13, 2011

(65) Prior Publication Data

US 2012/0099257 A1 Apr. 26, 2012

(30) Foreign Application Priority Data

Oct. 21, 2010 (TW) ................................ 99135967 A

(51) Int. Cl.
 *G06F 1/16* (2006.01)
(52) U.S. Cl.
 USPC ...... 361/679.21; 362/628; 455/348; 349/112; 345/214
(58) Field of Classification Search
 USPC ........ 362/97.1, 632, 633, 634, 615, 616, 628, 362/97.2, 297, 235; 455/24, 90.1, 550.1, 455/567, 575.4, 575.1, 347, 348; 346/106, 346/109; 349/58, 60, 65, 187, 139, 149, 349/112, 106; 345/650, 160, 168, 173, 156, 345/531, 659, 698, 174, 212, 211, 214; 361/679.27, 679.28, 679.29, 679.01, 361/679.09, 679.26, 679.05, 679.07, 361/679.22, 679.46, 679.3, 679.21, 679.55, 361/679.24, 679.34, 679.41, 679.58, 679.33
 See application file for complete search history.

(56) References Cited

U.S. PATENT DOCUMENTS

| | | | |
|---|---|---|---|
| 6,825,612 B2 * | 11/2004 | Lai ................................ | 313/512 |
| 2010/0246163 A1 * | 9/2010 | Chen et al. ................... | 362/97.1 |
| 2013/0083275 A1 * | 4/2013 | Ai et al. ........................ | 349/106 |

FOREIGN PATENT DOCUMENTS

| | | | | |
|---|---|---|---|---|
| CN | 101515085 A | | 8/2009 | |
| JP | 358021470 A | * | 8/1983 | ................... 524/788 |
| JP | 2010-117638 | | 5/2010 | |
| TW | I273325 | | 2/2007 | |
| TW | I311663 | | 7/2009 | |
| TW | I319691 | | 1/2010 | |
| TW | 201035630 | | 10/2010 | |

OTHER PUBLICATIONS

China Office Action dated Mar. 28, 2012.
English translation of abstract of TW I311663, Date Jul. 1, 2009.
English translation of abstract of TW I273325, Date Feb. 11, 2007.
English translation of abstract of TW I319691, Date Jan. 11, 2010.
Taiwan Office Action dated Aug. 30, 2013.
English translation of JP 2010-117638 (published May 27, 2010).

* cited by examiner

*Primary Examiner* — Hung Duong
(74) *Attorney, Agent, or Firm* — McClure, Qualey & Rodack, LLP

(57) ABSTRACT

A display module having an improved assembly structure is provided. The display module includes a frame, a display panel, and a glue. The frame has a side wall and a supporting part, wherein the supporting part has a supporting surface and the side wall is formed on the periphery of the supporting surface. A groove is formed on the supporting surface adjacent to the side wall and is distributed along the side wall. The display panel is disposed within the frame and has a bottom face and a side face. The bottom face is supported by the supporting surface of the supporting part. The side face faces the side wall and forms a gap with the side wall. The glue is filled in the gap and adheres the side wall to the side face.

15 Claims, 12 Drawing Sheets

DISPLAY MODULE

BACKGROUND OF THE INVENTION

1. Field of the Invention

This invention generally relates to a display module for a display device.

2. Description of the Prior Art

Display modules are widely used in display devices. With a huge growth of the market of display devices, the design of display modules used in display devices is getting more and more diversified to comply with the requirements on the functions and the appearances of display devices.

FIG. 1A is a schematic view of a conventional display module for a flat display device. The conventional display module 80 includes a frame 10, a display panel 30, a hollow rectangular-shaped (e.g. □-shaped) twin adhesive tape 40, and a light source module 91. As shown in FIG. 1B, the display panel 30 is adhered to the frame 10 by the □-shaped twin adhesive tape 40. More particularly, the bottom face of the display panel 30 is supported by the rim 11 of the frame 10 that extends inward, wherein the display panel 30 and the rim 11 are adhered by the □-shaped twin adhesive tape 40 disposed between them.

Regarding the conventional display module, the adhesiveness of the □-shaped twin adhesive tape 40 is limited. The adherence may be insufficient for a large scale flat display device due to the larger display panel 30. On the other hand, for middle and small scale flat display device, a □-shaped twin adhesive tape 40 having smaller width is used to comply with less frame width. Therefore, the adhering area becomes smaller and more likely to cause the problem of insufficient adherence to display panel 30.

SUMMARY OF THE INVENTION

It is an object of one or some embodiments to provide a display module having a display panel with enhanced adherence.

It is another object of one or some embodiments to provide a display module with a frame having a smaller frame width.

In an embodiment of the present invention, the display module includes a frame, a display panel, and a glue. The frame has a side wall and a supporting part, wherein the supporting part has a supporting surface and the side wall is formed on the periphery of the supporting surface. A groove is formed on the supporting surface adjacent to the side wall and is distributed along the side wall. The display panel is disposed within the frame and has a bottom face and a side face. The bottom face is supported by the supporting surface of the supporting part. The side face faces the side wall and forms a gap with the side wall. The glue is filled in the gap and adheres the side wall to the side face.

In another embodiment of the present invention, a portion of the glue is contained in the groove, wherein the viscosity of the glue in its liquid phase is larger than 30000 cps. The glue is light-shieldable. The frame can be a metallic piece. The supporting part can be a block piece. A first incline or a second incline can be formed in the groove, wherein the first incline inclines to extend from the supporting surface toward the side wall and the bottom of the groove, and the second incline inclines to extend from the side wall toward the supporting surface and the bottom of the groove. A portion of the groove can extend into the side wall.

In yet another embodiment of the present invention, the display module further includes a back plate having a base plate and a side plate formed on the periphery of the base plate, wherein the outside of the side wall leans against the inside of the side plate, and the supporting part is disposed on the base plate near the side plate.

In yet another embodiment of the present invention, the display module includes a back plate, a frame, a display panel, and a glue. The back plate has a base plate and a side plate formed on the periphery of the base plate. The frame has a supporting part disposed near the side plate, wherein the supporting part has a supporting surface; one side of the supporting part near the side plate has a third incline inclines toward the side plate; the third incline and the inner face of the side plate form a groove. The display panel is disposed on an inner side of the side plate, wherein the display panel has a bottom face and a side face; the bottom face is supported by the supporting surface of the supporting part; the side face faces the side plate and forms a gap with the side plate. The glue is filled in the gap and adheres the side plate to the side face.

In yet another embodiment of the present invention, the display module further includes a light source module. More particularly, the display module includes a light source module, a frame, a display panel, and a glue. The light source module has a light emitting face. The frame surrounds the light source module, wherein the display face of the display panel is opposite to the light emitting face.

DETAILED DESCRIPTION OF THE PREFERRED EMBODIMENT

Figure 1A:
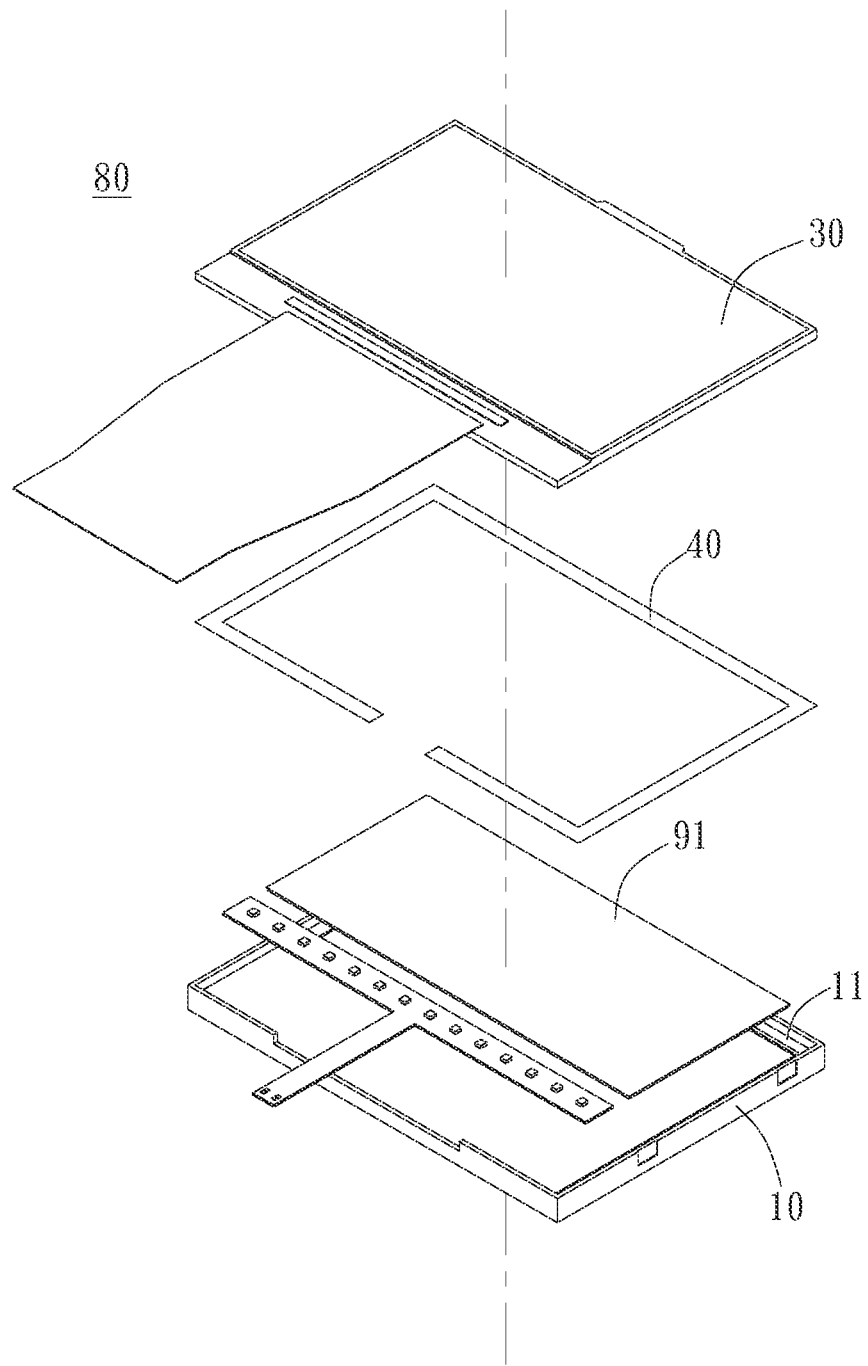
FIGS. 1A and 1B are schematic views of prior arts.
Figure 1B:
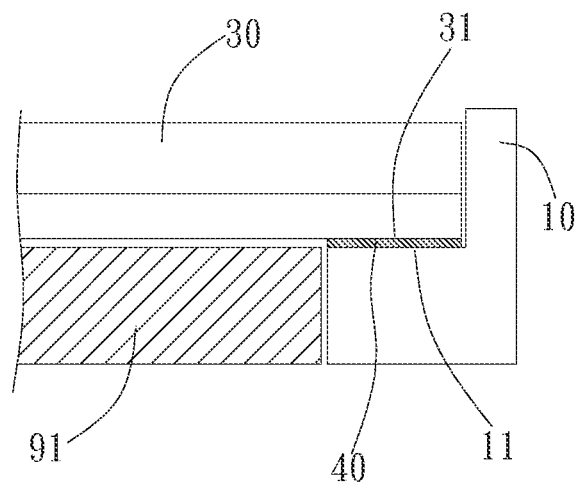
Figure 2A:
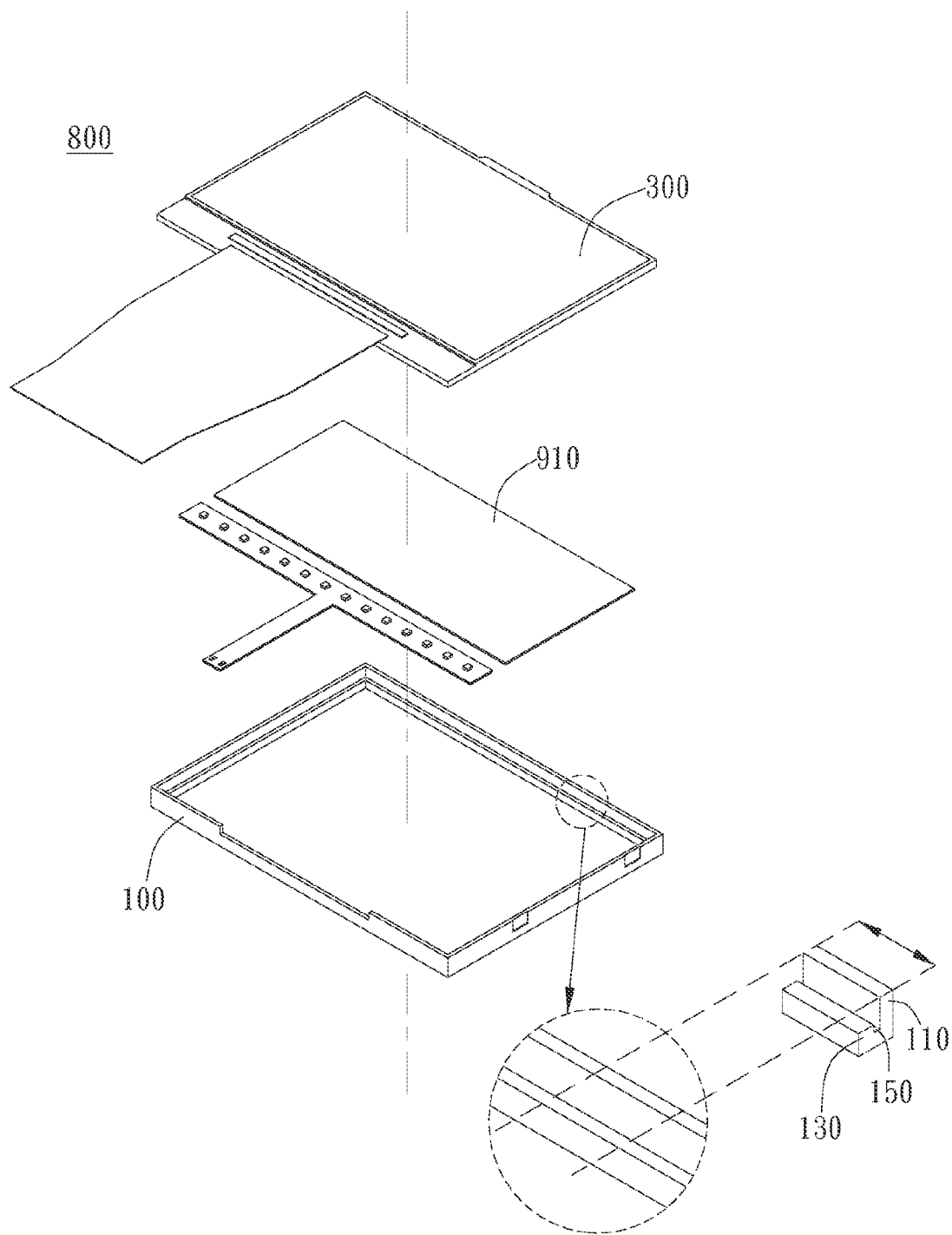
FIGS. 2A and 2B are schematic views of embodiments of the present invention.
Figure 2B:
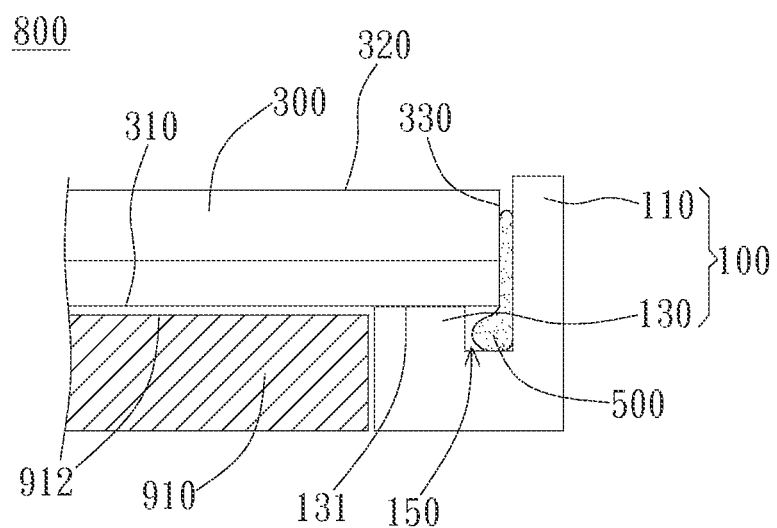

As the embodiments shown in FIGS. 2A and 2B, the display module 800 includes a frame 100, a display panel 300, and a glue 500. The frame 100 has a side wall 110 and a supporting part 130, wherein the supporting part 130 has a supporting surface 131 and the side wall 110 is formed on the periphery of the supporting surface 131. A groove 150 is formed on the supporting surface 131 adjacent to the side wall 110 and is distributed along the side wall 110. In other words, the supporting part 130 extends from the bottom of the side wall 110 to the inner side of the frame 100, and the groove 150 is formed between the side wall 110 and the supporting part 130, wherein the groove 150 is substantially lower than the supporting surface 131. In a preferred embodiment, besides the frame 100, the display panel 300, and the glue 500, the display module 800 further includes a light source module 910. The light source module 910 has a light emitting face 912. The frame 100 surrounds the light source module 910. The display face 320 of the display panel 300 is opposite to the light emitting face 912 of the light source module 910, wherein the light source module 910 can be a direct-light type module or a side-light-type module.

As the embodiments shown in FIGS. 2A and 2B, the display panel 300 is disposed within the frame 100 and has a bottom face 310 and a side face 330. The edge of the bottom face 310 is supported by the supporting surface 131 of the supporting part 130. The side face 330 faces the side wall 110 to form a gap between the side wall 110 and the display panel 300. The glue 500 is filled in the gap and adheres the side wall 110 to the side face 330. More particularly, by the supporting surface 131 of the supporting part 130 to support the edge of the display panel 300, the weight of the display panel 300 is loaded on the supporting part 130 to maintain the vertical position of the display panel 300 corresponding to the frame 100. By filling in the gap between the side wall 110 and the side face 330 with the glue 500 to adhere the side wall 110 and the side face 330, the horizontal position of the display panel 300 corresponding to the frame 100 can be maintained. To sum up, the display panel 300 is fixed onto the frame 100 to eliminating the □-shaped twin adhesive tape, by the support of the supporting part 130 to the bottom face 310 and the adherence of the glue 500 to the side face 330. Accordingly, the expense of using the □-shaped twin adhesive tape can be decreased and the problem of insufficient adherence induced from smaller adhering area can be solved. Moreover, since the gap between the side face 330 and the side wall 110 is filled with the glue 500, the glue 500 further blocks moisture from entering the light source module 910 via the gap between the side face 330 and the side wall 110 from the outside of the display face 320 of the display panel 300.

Figure 3:
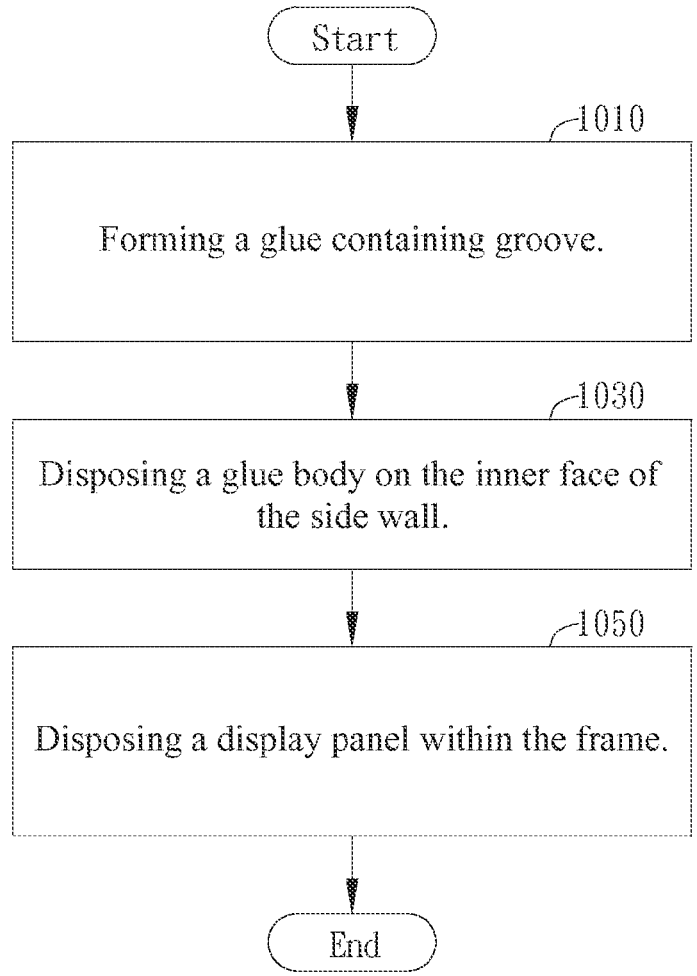
FIG. 3 is a flow chart of one embodiment to manufacture the display module of the present invention.

On the other hand, as shown in FIG. 2B, a portion of the glue 500 is contained in the groove 150 to avoid overflowing upward or toward the display panel 300. More particularly, as the flow chart of one embodiment to manufacture the display module of the present invention shown in FIG. 3, the display module is manufactured by the following steps.

Figures 4A, 4B:
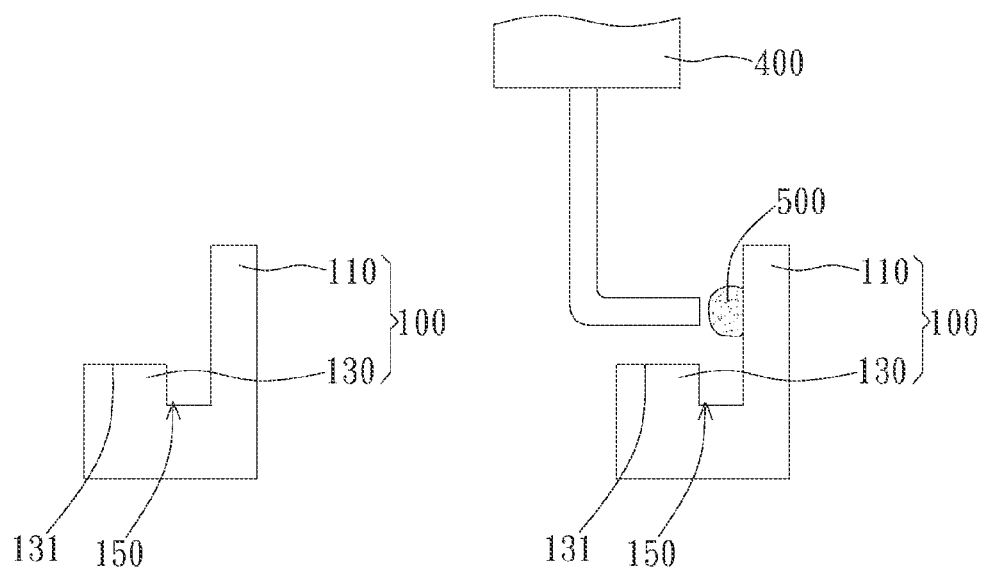
FIGS. 4A-4C are schematic views showing the manufacturing of the display module of the present invention.

Step 1010, the step of forming a groove is performed. As the embodiments shown in FIGS. 2A and 2B, the frame 100 includes the side wall 110 and the supporting part 130, wherein the supporting part 130 extends from the bottom of the side wall 110 to the inner side of the frame 100 and has the supporting surface 131. In step 1010, the groove 150 is preferably formed on the supporting surface 131 adjacent to the side wall 110 and is distributed along the side wall 110. More particularly, as shown in FIG. 4A, a frame 100 having a groove 150 made by injection molding or machining is provided.

Step 1030, the step of disposing a glue on the inner face of the side wall is performed. More particularly, in one embodiment, the glue 500 is disposed on the inner face of the side wall 110 by injecting or coating with a glue supplier as shown in FIG. 4B. In some embodiments, the viscosity of the glue in its liquid phase is larger than 30000 cps to make the glue 500 stay on the inner face of the side wall 110 and maintain a specific thickness. In some embodiments, the glue 500 is light-shieldable to decrease the amount of light transmitting through the glue 500.

Figure 4C:
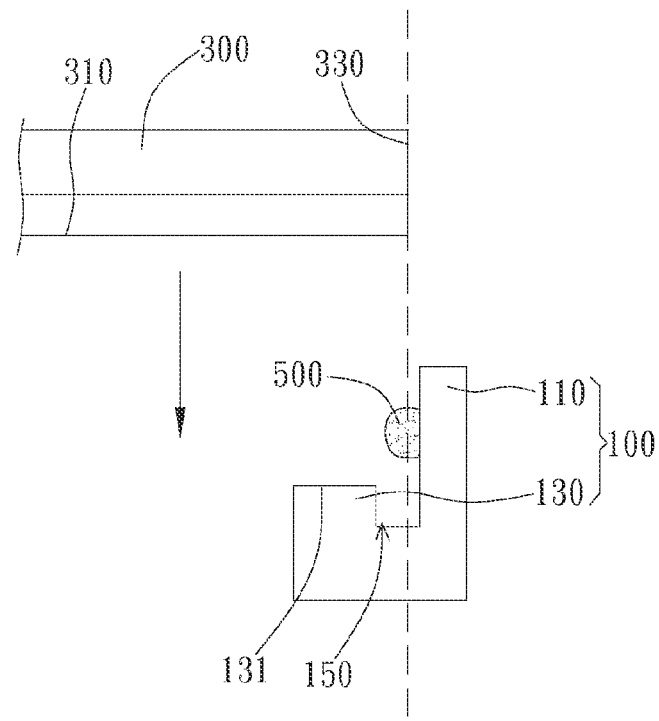

Step 1050, the step of disposing a display panel within the frame is performed. In step 1050, the display panel 300 has a bottom face 310 and a side face 330 adjacent to each other. When disposing the display panel 300 within the frame 100, the bottom face 310 scrapes a portion of the glue 500 to make the glue 500 spread between the side face 330 and the side wall 110, wherein a portion of the glue 500 is contained in the groove 150. More particularly, the display panel 300 is assembled downward with the frame 100 as shown in FIG. 4C. In the assembling process, the edge of the bottom face 310 of the display panel 300 scrapes or contacts a portion of the glue 500 to make the glue 500 spread between the side face 330 and the side wall 110 as shown in FIG. 2B. 2B to adhere the side face 330 to the side wall 110. Spare glue 500 is contained in the groove 150 to avoid overflowing upward or toward the display panel 300. In a case the amount of the glue 500 is exactly sufficient to adhere the side face 330 to the side wall 110, there will be no spare glue 500 contained in the groove 150. However, in the some embodiments, for the convenient in manufacturing and a better yield rate, the amount of the glue 500 is more than the required amount for adhering the side face 330 and the side wall 110 to avoid insufficient adherence caused by insufficient glue 500.

Figure 5:
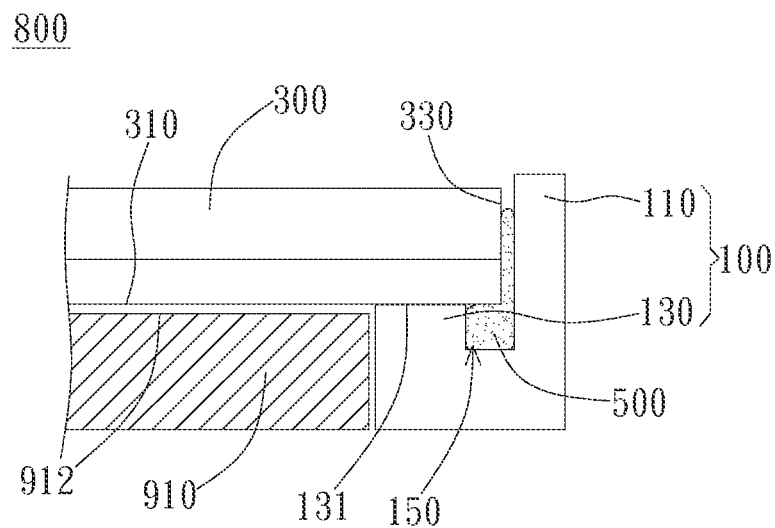
FIG. 5 is a schematic view of another embodiment of the present invention.

As the embodiment shown in FIG. 5, when the glue 500 contained in the groove 150 contacts individually the bottom face 310 of the display panel 300 and the bottom of the groove 150, the glue 500 simultaneously adheres the side face 330 to the side wall 110 and adheres the bottom face 310 to the bottom of the groove 150. In other words, the adherence between the display panel 300 and the frame 100 is strengthened.

Figure 6A:
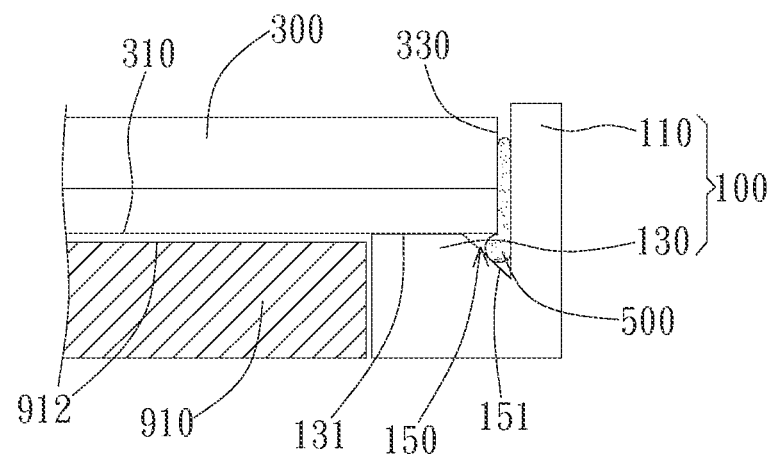
FIGS. 6A-6C are schematic views of embodiments of the present invention having different shaped grooves.
Figure 6B:
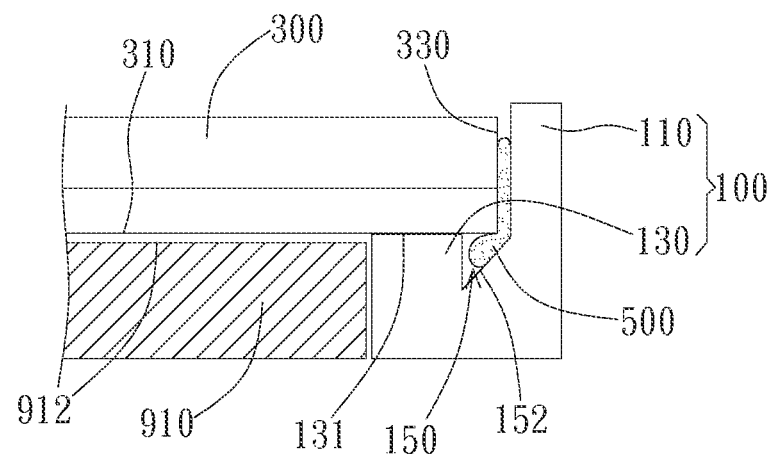
Figure 6C:
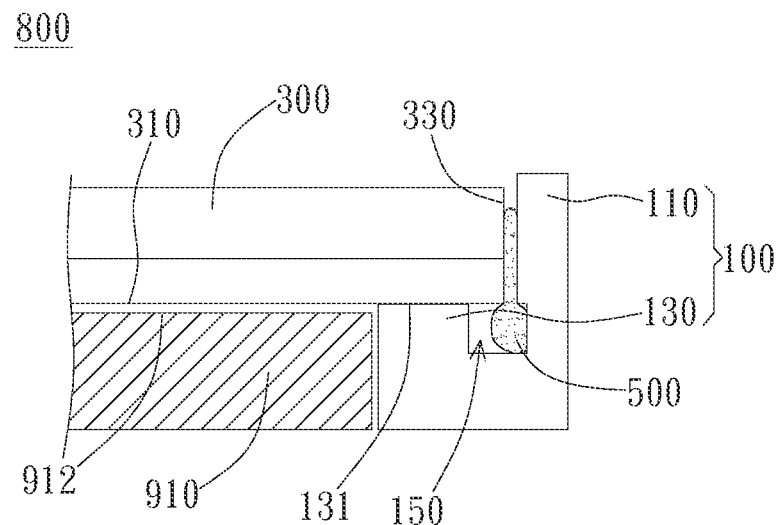

For the groove 150, a variety of shapes can be adopted in accordance with the requirements. As the embodiment shown in FIG. 6A, a first incline 151 is formed in the groove 150, wherein the first incline 151 inclines to extend from the supporting surface 131 toward the side wall 110 and the bottom of the groove 150. As the embodiment shown in FIG. 6B, a second incline 152 is formed in the groove 150, wherein the second incline 152 inclines to extend from the side wall 110 toward the supporting surface 131 and the bottom of the groove 150. As the embodiment shown in FIG. 6C, a portion of the groove 150 extends into the side wall 110. The above mentioned embodiments respectively have benefits in glue flowing, machining convenience, or frame strength. For example, the incline can make the glue flow more swimmingly and extending a portion of the groove 150 into the side wall 110 can increase the amount of glue contained in the groove 150.

Figure 7:
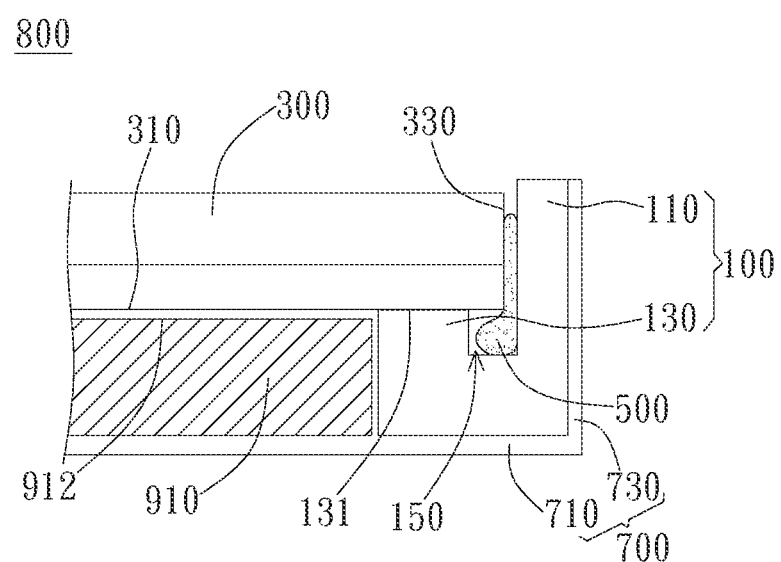
FIG. 7 is a schematic view of a preferred embodiment of the present invention.

As the embodiment shown in FIG. 7, the display module 800 further includes a back plate 700 having a base plate 710 and a side plate 730 formed on the periphery of the base plate 710, wherein the outside of the side wall 110 leans against the inside of the side plate 730, wherein the supporting part 130 is disposed on the base plate 710 near the side plate 730. In some embodiments, the back plate 700 is a metallic piece; in some embodiments, the back plate 700 is plastic piece, alloy piece or piece make up of the plastic and metallic materials More particularly, the back plate 700 supports and fixs position the frame 100 and the light source module 910, wherein the frame 100 supports the display panel 300.

Figure 8A:
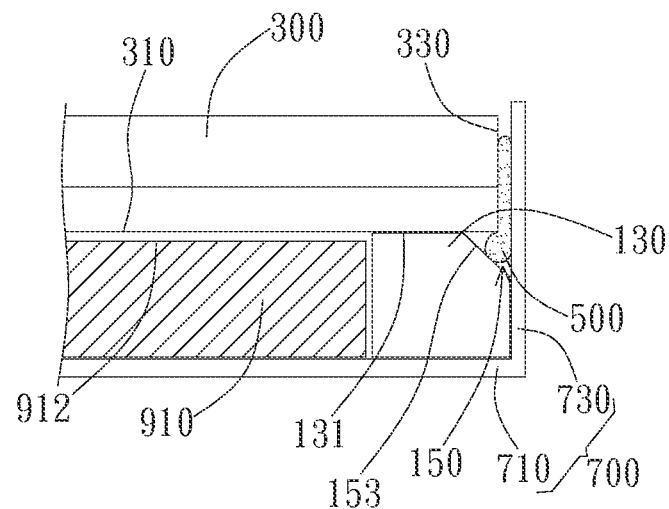
FIGS. 8A-8B to 9A-9D are schematic views of different embodiments of the present invention.
Figure 8B:
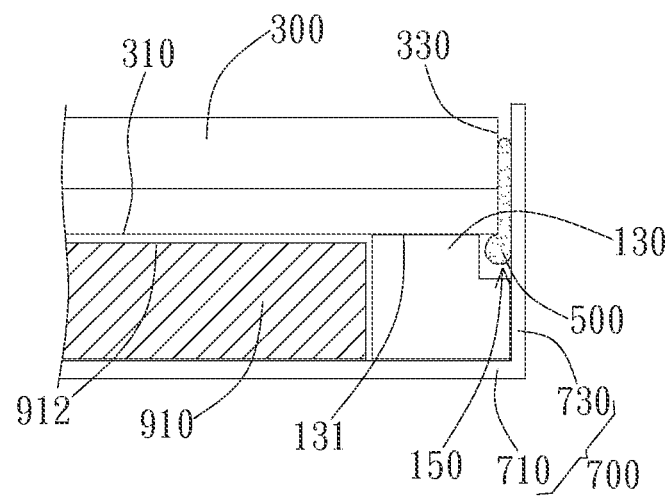

In another embodiment shown in FIG. 8A, the side wall 100 of the frame 100 can be neglected and replaced by the side plate 730 of the back plate 700, wherein the side plate 730 is formed on the periphery of the base plate 710. The supporting part 130 is disposed on the base plate 710 near the side plate 730. One side of the supporting part 130 near the side plate 730 has a third incline 153, and the third incline 153 inclines toward the side plate 730, wherein the third incline 153 and the inner face of the side plate 730 form the groove 150. Accordingly, the width of the frame 100 can be further reduced to make a display panel 300 having larger area be disposed in a display module having the same size. In a different embodiment, it is not limited to forming the groove 150 by the third incline 153 and the inner face of the side plate 730 together. In the embodiment shown in FIG. 8B, the third incline 153 shown in FIG. 8A is replaced by a right angle notch, wherein the right angle notch and the inner face of the side plate 730 form the groove 150 together. But it's not limited to, a round, curve or ladder line is replaced to the third incline 153.

In the above mentioned embodiments, the back plate 700 supports and locations the frame 100 and the light source module 910, wherein the frame 100 supports the display panel 300. The frame 100 is made of polymer or plastic material by injection molding or machining. In other words, the side wall 110 and the supporting part 130 are substantially two parts on the same piece. The back plate 700 is made of metal. In different embodiments, the frame 100 can be made of metal and can be formed by several pieces.

Figure 9A:
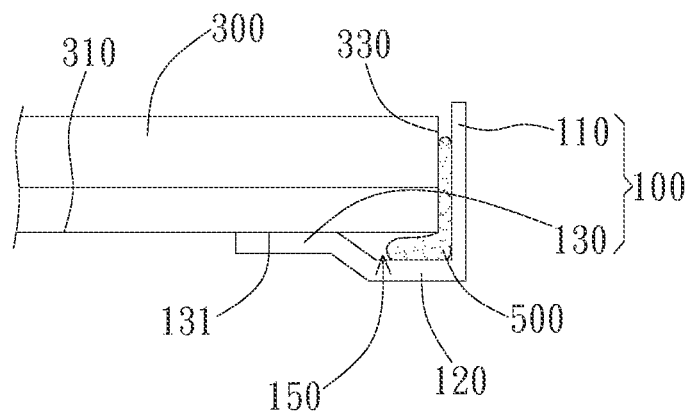
Figure 9B:
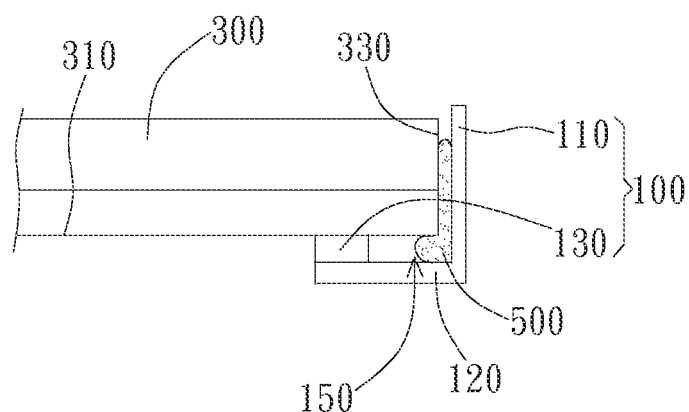

In a different embodiment shown in FIG. 9A, the frame 100 is a metallic piece, wherein the side wall 110, the supporting part 130, and the groove 150 are formed by pressing, punching, molding or stamping. More particularly, the side wall 110 bends inward to form a stage or ladder as the supporting part 130, wherein the supporting part 130 connects to the side wall 110 with a tray part 120 lower than the supporting surface 131, wherein the supporting part 130, the tray part 120, and the side wall 110 substantially form the groove 150. In the embodiment shown in FIG. 9B, the supporting part 130 is formed by a block, wherein the frame 100 can be a metallic piece or made of polymer. More particularly, the side wall 110 bends inward to form an L shape, wherein a block is disposed at the bending end of the side wall 110 to form the supporting part 130, wherein the supporting part 130 connects to the side wall 110 with a tray part 120 lower than the supporting surface 131. As such, the supporting part 130, the tray part 120, and the side wall 110 substantially form the groove 150. In other words, the block is adhered at one end of the frame 100 opposite to the side wall 110 to form the supporting part 130, wherein the groove 150 is formed between the supporting part 130 and the side wall 110. Accordingly, the width of the frame 100 can be further reduced, i.e. the frame having narrower width can be used to make a display panel 300 having larger area disposed in a display module having the same size. Taking a different point of view, the frame 100 is substantially a transformation of the back plate, wherein an additional frame is not required.

Figure 9C:
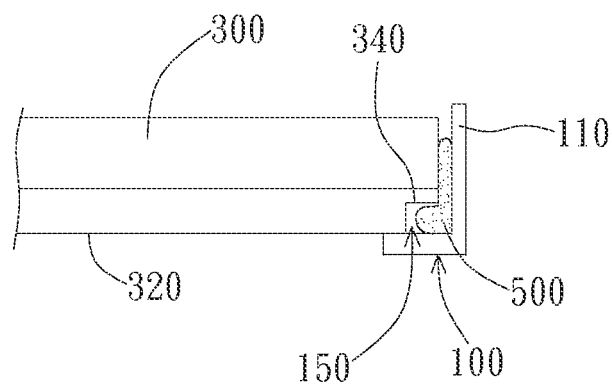
Figure 9D:
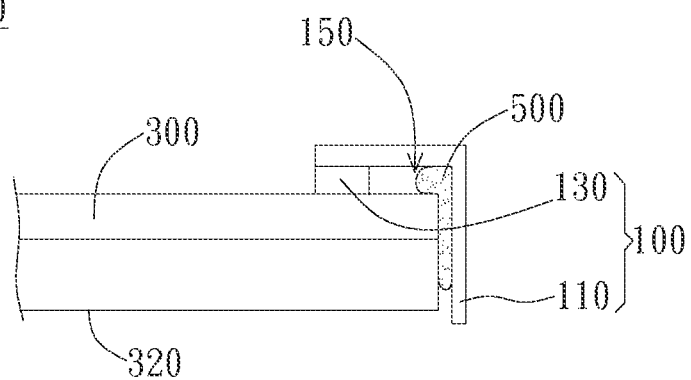

In the embodiment shown in FIG. 9C, one end of the display face 320 of the display panel 300 near the side wall 110 has a notch 340, wherein the notch 340 and the side wall 110 substantially form the groove 150 together. In other words, the groove 150 is formed on the corner of the display panel 300. It results the accommodation between display panel 300 and frame 100. In different embodiments, the notch 340 can be replaced by other structures such as inclines. On the other hand, in the embodiment shown in FIG. 9D, the display panel 300 can be assembled with the frame 100 by making the opposite face of the display face 320 face the frame 100. The side glue can seal the display panel 300 to block moisture. In the embodiments shown in FIGS. 9A to 9D, one of the characteristics is to adhere the metallic frame and the display panel. Therefore, the present invention is not limited to in the application of LCD display panel. The embodiments shown in FIGS. 9A to 9D are preferably used in display panels needing no light source module.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display module, comprising:
a frame having a side wall, a supporting part and a groove, wherein the supporting part has a supporting surface and the side wall is formed on the periphery of the supporting surface, and the groove is formed on the supporting surface adjacent to the side wall and is distributed along the side wall;
a display panel disposed within the frame, wherein the display panel has a bottom face and a side face, the bottom face is supported by the supporting surface of the supporting part, and the side face faces the side wall and forms a gap with the side wall;
a glue filled in the gap, wherein the glue adheres the side wall to the side face; and
a back plate having a base plate and a side plate formed on the periphery of the base plate;
wherein the outside of the side wall leans against the inside of the side plate, and the supporting part is disposed on the base plate near the side plate.

2. The display module of claim 1, wherein a portion of the glue is contained in the groove.

3. The display module of claim 1, wherein a first incline is formed in the groove, and the first incline inclines to extend from the supporting surface toward the side wall and the bottom of the groove.

4. The display module of claim 1, wherein a second incline is formed in the groove, and the second incline inclines to extend from the side wall toward the supporting surface and the bottom of the groove.

5. The display module of claim 1, wherein the viscosity of the glue in its liquid phase is larger than 30000 cps.

6. The display module of claim 1, wherein the glue is light-shieldable.

7. The display module of claim 1, wherein a portion of the groove extends into the side wall.

8. A display module, comprising:
a frame having a side wall, a supporting part and a groove, wherein the supporting part has a supporting surface and the side wall is formed on the periphery of the supporting surface, and the groove is formed on the supporting surface adjacent to the side wall and is distributed along the side wall;
a display panel disposed within the frame, wherein the display panel has a bottom face and a side face, the bottom face is supported by the supporting surface of the supporting part, and the side face faces the side wall and forms a gap with the side wall; and
a glue filled in the gap, wherein the glue adheres the side wall to the side face;
wherein the side wall bends inward to form a stage as the supporting part, the supporting part connects to the side wall with a tray part lower than the supporting surface, and the supporting part, the tray part, and the side wall substantially form the groove.

9. A display module, comprising:
a frame having a side wall, a supporting part and a groove, wherein the supporting part has a supporting surface and the side wall is formed on the periphery of the supporting surface, and the groove is formed on the supporting surface adjacent to the side wall and is distributed along the side wall;
a display panel disposed within the frame, wherein the display panel has a bottom face and a side face, the bottom face is supported by the supporting surface of the supporting part, and the side face faces the side wall and forms a gap with the side wall; and
a glue filled in the gap, wherein the glue adheres the side wall to the side face;
wherein the side wall bends inward to form an L shape, a block is disposed at the bending end of the side wall to form the supporting part, the supporting part connects to the side wall with a tray part lower than the supporting surface, and the supporting part, the tray part, and the side wall substantially form the groove.

10. A display module, comprising:

a light source module having a light emitting face;

a frame surrounding the light source module and having a side wall, a supporting part and a groove, wherein the supporting part has a supporting surface and the side wall is formed on the periphery of the supporting surface, and the groove is formed on the supporting surface adjacent to the side wall and is distributed along the side wall;

a display panel disposed within the frame, wherein the display face of the display panel is opposite to the light emitting face, the display panel has a bottom face and a side face, the bottom face is supported by the supporting surface of the supporting part, and the side face faces the side wall and forms a gap with the side wall;

a glue filled in the gap, wherein the glue adheres the side wall to the side face, and a portion of the glue is contained in the groove; and a back plate having a base plate and a side plate formed on the periphery of the base plate; wherein the outside of the side wall leans against the inside of the side plate, and the supporting part is disposed on the base plate near the side plate.

11. The display module of claim 10, wherein a first incline is formed in the groove, and the first incline inclines to extend from the supporting surface toward the side wall and the bottom of the groove.

12. The display module of claim 10, wherein a second incline is formed in the groove, and the second incline inclines to extend from the side wall toward the supporting surface and the bottom of the groove.

13. The display module of claim 10, wherein the viscosity of the glue in its liquid phase is larger than 30000 cps.

14. The display module of claim 10, wherein the side wall bends inward to form a stage as the supporting part, the supporting part connects to the side wall with a tray part lower than the supporting surface, and the supporting part, the tray part, and the side wall substantially form the groove.

15. The display module of claim 10, wherein the side wall bends inward to form an L shape, a block is disposed at the bending end of the side wall to form the supporting part, the supporting part connects to the side wall with a tray part lower than the supporting surface, and the supporting part, the tray part, and the side wall substantially form the groove.

* * * * *